(12) United States Patent
Rostampour (10) Patent No.: US 8,930,684 B2
(45) Date of Patent: Jan. 6, 2015

(54) ADDING A RUNTIME SERVICE FOR FIRMWARE-BASED IMAGES FOR A DEVICE NOT KNOWN TO AN OPERATING SYSTEM

(75) Inventor: Arad Rostampour, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2933 days.

(21) Appl. No.: 11/259,843

(22) Filed: Oct. 26, 2005

(65) Prior Publication Data

US 2007/0094655 A1 Apr. 26, 2007

(51) Int. Cl.
*G06F 9/00* (2006.01)
*G06F 9/24* (2006.01)
*G06F 9/44* (2006.01)
*G06F 9/445* (2006.01)

(52) U.S. Cl.
CPC ........................................ *G06F 8/60* (2013.01)
USPC .............................................. 713/1; 717/168

(58) Field of Classification Search
None
See application file for complete search history.

(56) References Cited

U.S. PATENT DOCUMENTS

| | | | |
|---|---|---|---|
| 5,774,793 A | 6/1998 | Cooper et al. | |
| 6,219,828 B1 | 4/2001 | Lee | |
| 6,269,442 B1 | 7/2001 | Oberhauser et al. | |
| 6,754,828 B1 | 6/2004 | Marisetty et al. | |
| 6,868,507 B1 * | 3/2005 | Gurumoorthy et al. | 713/1 |
| 6,901,534 B2 | 5/2005 | Carr | |
| 6,990,576 B2 * | 1/2006 | Qureshi et al. | 713/2 |
| 7,159,105 B2 * | 1/2007 | Rothman et al. | 713/1 |
| 7,181,610 B2 * | 2/2007 | Zimmer et al. | 713/2 |
| 7,194,612 B2 * | 3/2007 | Rothman et al. | 713/1 |
| 2002/0141399 A1 | 10/2002 | Brown et al. | |
| 2004/0030876 A1 * | 2/2004 | Qureshi et al. | 713/1 |
| 2004/0177349 A1 | 9/2004 | Black-Ziegelbein et al. | |
| 2004/0193865 A1 | 9/2004 | Nguyen et al. | |
| 2004/0230785 A1 | 11/2004 | Ramiz et al. | |
| 2004/0230963 A1 * | 11/2004 | Rothman et al. | 717/168 |
| 2004/0255286 A1 | 12/2004 | Rothman et al. | |
| 2005/0076196 A1 * | 4/2005 | Zimmer et al. | 713/1 |

FOREIGN PATENT DOCUMENTS

| | | |
|---|---|---|
| WO | WO 96/35990 | 11/1996 |
| WO | WO 2004/109510 | 12/2004 |
| WO | WO 2004/109510 A2 | 12/2004 |

OTHER PUBLICATIONS

Anonymous: "Method for dynamically extending the runtime services of Extended Firmware Interface (EFI) using XML." IP. Com Journal, IP. Com Inc., West Henrietta, NY, US.
Anonymous. Method for dnymaically extending the runtime services of Extended Firmware Interface (EFI) using XML. ip.com Journal, Jun. 16, 2004.
International Search Report, May 26, 2007 (7 pgs).

* cited by examiner

*Primary Examiner* — Don Wong
*Assistant Examiner* — Erika Kretzmer (57) ABSTRACT

Systems, devices, and methods, including program instructions, are provided for firmware filters and patches. One method embodiment includes executing extended firmware interface (EFI) program instructions during runtime to modify a firmware implementation underlying an interface and invoking the modified firmware implementation, while the original firmware code in non-volatile memory remains unmodified. A further embodiment includes adding a runtime service in an system abstraction layer (SAL) interface and adding a subordinate runtime service that describes a device not known to a firmware image on a system but useable by a particular operating system (OS).

28 Claims, 3 Drawing Sheets

ADDING A RUNTIME SERVICE FOR FIRMWARE-BASED IMAGES FOR A DEVICE NOT KNOWN TO AN OPERATING SYSTEM

BACKGROUND

A computing device, such as a server, router, desktop computer, laptop, etc., includes an operating system layer and an application layer to enable the device to perform various functions or roles. The operating system layer includes a "kernel" (i.e., master control program) that runs the computing device. The kernel provides task management, device management, and data management, among others. The kernel sets the standards for application programs that run on the computing device and controls resources used by application programs. The application layer includes programs, i.e., executable instructions, which are located above the operating system layer and accessible by a user. As used herein, "user space", "user-mode", or "application space" implies a layer of code which is less privileged and more directly accessible by users than the layer of code which is in the operating system layer or "kernel" space. The operating system layer has software programs that include a set of Application Program Interfaces (APIs). The API includes callable software procedures for execution on the processing resources in support of application procedures. The language and/or message format of the APIs allow an operating system to interpret executable instructions received from program applications (e.g., service applications) in the application layer and return results to the programs in the application layer. The operating system performs functions such as scheduling application programs and resolving conflicts between applications that request access to the same resources. Additionally, OSs communicate service requests from application programs to the hardware device drivers. As used herein an operating system of a computer system can include a Unix, Linux, AIX, Windows, and/or Mac operating system, etc. Computer systems can include network interfaces to connect to other computing systems and outside networks over a local area network (LAN), wide area network (WAN), Internet, and/or wireless network, etc.

Firmware is a set of hardware setup and runtime programs. Firmware is stored in flash memory, read only memory (ROM), on disk, e.g., on a number of kinds of storage, etc. Firmware includes programs such as device drivers, which are used to activate the hardware of a computer system. For example, some firmware (FW) can be provided pre-operating system (OS) boot, e.g., is used to bootstrap an OS such that it knows how to run on a particular set of system hardware (HW) to get to a standard handoff state, i.e., state from which the OS takes control. This example can be achieved by the FW passing tables, services, etc., to the OS for the OS to take over control of a particular device.

Firmware is often released on sporadic schedules, and not easily adaptable to changes that are needed to add or modify particular system behavior. Sometimes a particular set of firmware is useful to a particular OS, but is not useful, and may even pose issues for, other OSs on a system which supports multiple OSs with a shared firmware image. Having per OS behaviors or structures can add complexity to a given system. Additionally, it is possible to have a particular firmware behavior for a particular situation, such as OS install, while another behavior during an OS boot.

A firmware interface refers to software routines and data structures to enable communication between an operating system and hardware resources of a system, e.g., hardware and software resources for accomplishing computational tasks. Such a firmware interface may define an interface between the hardware resources of a processing system and for one or more independently developed operating systems. Beginning input an output system (BIOS) routines may be executed on hardware resources to install the software routines and data structures of a firmware interface on hardware resources of a processing system and then subsequently install an operating system during a boot sequence.

System firmware may have an extended firmware interface (EFI) format. The extended firmware interface (EFI) format is an industry architecture specification. The EFI provides an interface between the OS and the platform firmware. The interface is in the form of data tables that contain platform-related information, and boot and runtime service calls that are available to the OS and its loader. The EFI helps provide an environment for booting the OS and running system maintenance applications. The EFI provides a coherent, scalable platform environment. The EFI specification defines a solution for the firmware to describe platform features and surface platform capabilities to the OS.

The existence of EFI or other platform firmware (FW) does not accommodate sporadic schedules to firmware releases or adaptability to changes to add or modify particular operating system behavior. Nor does the EFI specification itself provide the capability to filter and/or patch firmware changes associated with a particular OS but not other OSs on a system which supports multiple OSs which share firmware image.

DETAILED DESCRIPTION

It is useful to sometimes add or filter firmware functionality, e.g., hiding or moving devices. For example, if an OS doesn't support a specific functionality it would be desirable to change the OS's view of the particular functionality via use of firmware and have the firmware do the work on the OS's behalf. Advantageously this would provide a value added beyond a core set of firmware without functionality being inextricably bound by the work of firmware teams.

Embodiments described herein provide systems, devices, and methods, including program instructions, for firmware filters and patches. Embodiments include program instructions executable for firmware modification associated with OS handoff data and runtime services on a system, e.g., tables that include information relating to a particular system. For example, program instructions can execute at EFI to insert themselves and modify an implementation of data tables and runtime services underlying an interface, e.g., EFI, SAL, PAL, ACPI, etc. Program instructions can then execute to invoke the modified implementation. That is, program instructions located between the interface to a set of firmware and a caller of the interface, e.g., an OS call, diagnostic software call, loader call, etc., can execute to change, e.g., patch or filter, a table or runtime services in order to provide a particular firmware behavior in a particular operating system (OS) situation, e.g., boot or runtime services, without changing a firmware image on the system.

As the reader will appreciate, a system's firmware image is a set of non-volatile instructions which are executable to boot a system and provide an OS handoff state to the system. This firmware image includes beginning input/output system (BIOS) information, EFI information, device types and locations on the system, etc. The firmware image is burned into non-volatile memory, e.g., read only memory (ROM), when the system is built and stays the same between system boots until physically replaced. In the past, altering firmware behavior for a particular situation involved physically changing the firmware image on the system. According to present embodiments program instructions instead execute to insert themselves to change a representation of particular firmware for a particular caller. Hence, program instructions can execute in conjunction with a particular application program interface (API) call to change, e.g., patch or filter, a firmware interface and provide a different firmware implementation.

As used herein and described in more detail below, patching and/or filtering can include patching and/or filtering static data and runtime services. Static data stays the same for a particular boot and runtime services are services that are dynamically provided to a caller during system operation. As used herein, patching includes executing program instructions to: (1) change a table or runtime service entrypoint in an existing memory location; (2) generate a new table or runtime service entrypoint and allocate an entirely new memory location for the same; and/or (3) change the pointer associated with the above. Further, filtering includes executing program instructions to modify a call to firmware before passing the call to a particular existing set of firmware and/or executing program instructions to pass the call to the existing set of firmware and then modifying the results received back from the firmware before returning the results to the calling entity.

Figure 1:
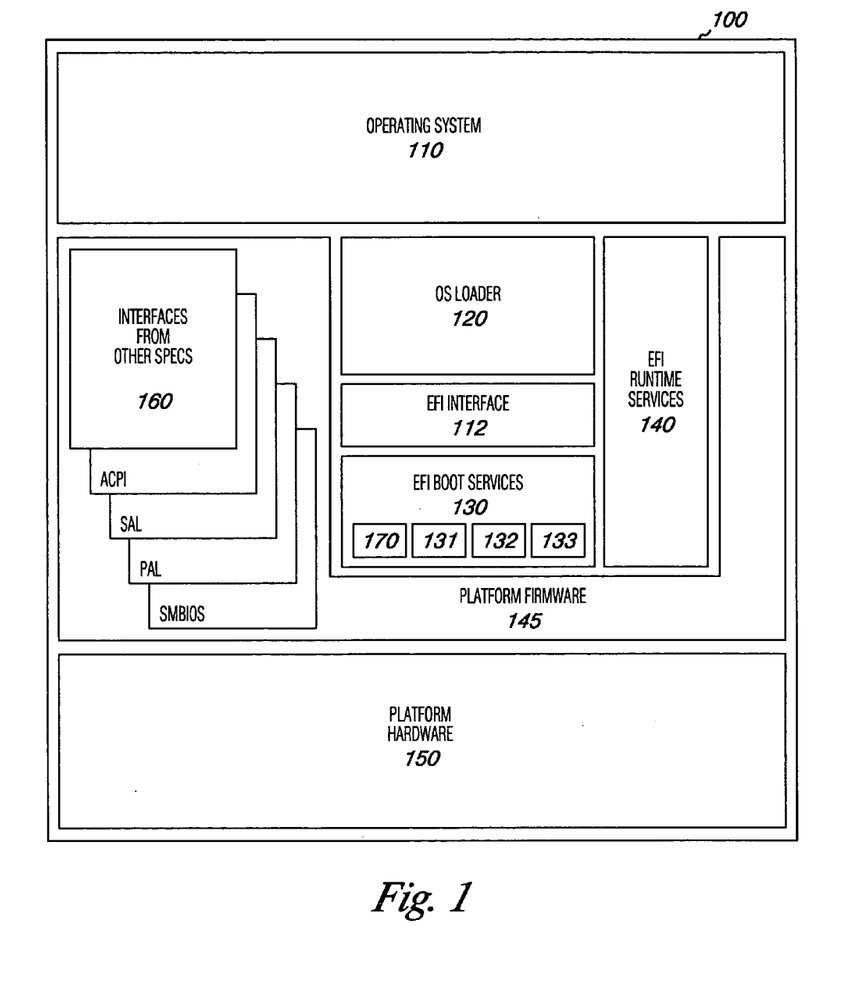
FIG. 1 is a block diagram of an extended firmware interface environment suitable to implement embodiments of the invention.

FIG. 1 illustrates a computing system 100 having an extended firmware interface (EFI) and shows the principal components of EFI and their relationship to the platform hardware 150 and the OS software 110. The platform firmware 145 is able to retrieve an OS loader image 120 from the EFI system firmware location in memory. System firmware may be stored within a memory chip that holds it's content without electrical power, such as ROM, PROM, EPROM, EEPROM, or other computer readable memory, etc. Once the platform firmware 145 has begun to retrieve the OS loader image, the OS loader 120 continues to boot the complete operating system 110. In doing so, the OS loader 120 may use the EFI boot services 130 and interfaces defined by EFI interface 112 or interfaces from other specifications 160, e.g., advanced configuration and power interface (ACPI), system abstraction layer (SAL), processor abstraction layer (PAL), system management basic input/output system (SMBIOS), etc., to survey, comprehend, and initialize the various platform components 150, e.g., platform hardware, and the OS software 110 that manages them. EFI runtime services 140 and console services 170 are also available to the OS loader 120, as the same will be known and understood by one of ordinary skill in the art. The EFI boot services 130 can include boot devices 131, protocols and handlers 132, and various drivers 133, as the same will be known and understood by one of ordinary skill in the art. Further, the above mentioned interfaces of ACPI, EFI, SAL, PAL, etc. can access tables and entry points, e.g., tables that contain information on the location devices, the behavior of particular devices, device types, and location of entrypoints.

Figure 2:
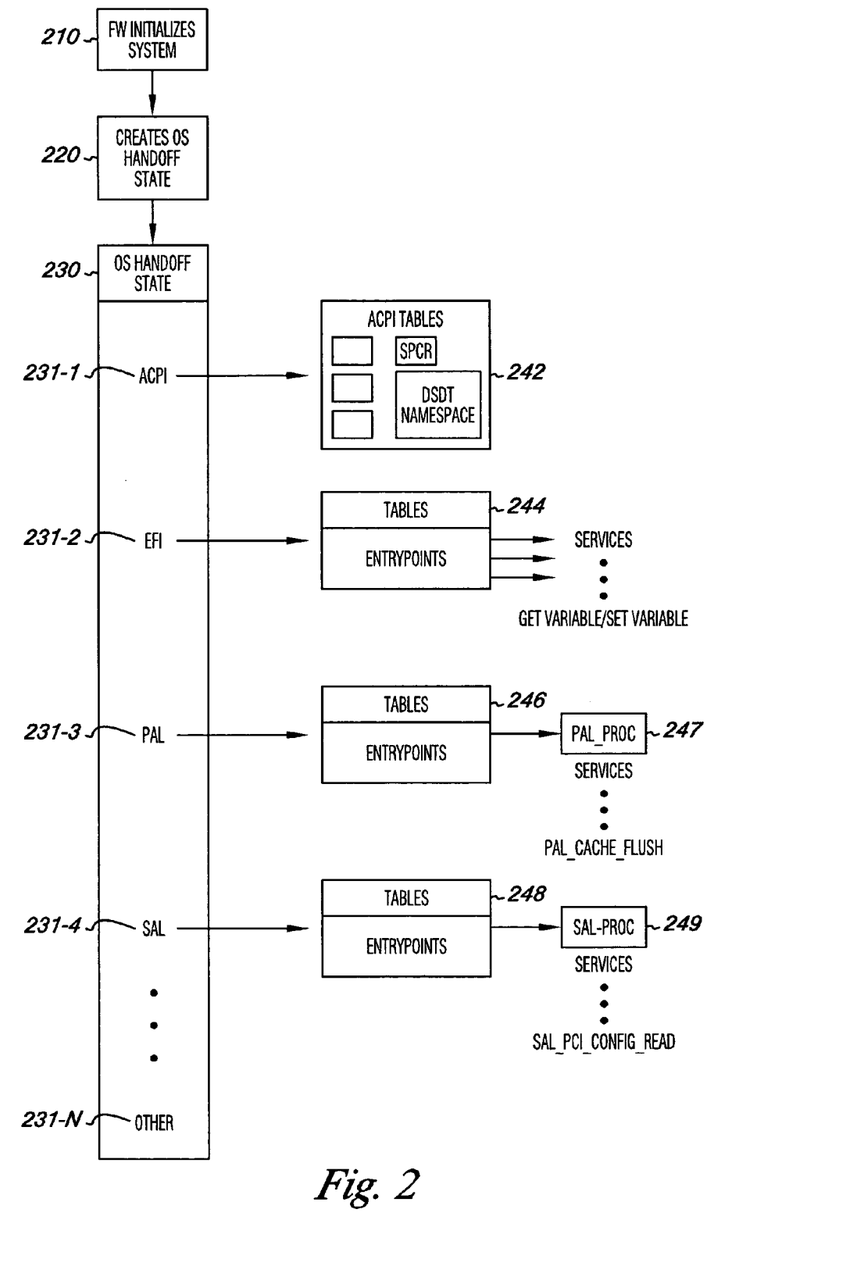
FIG. 2 is a block diagram of an embodiment system initialization and OS handoff state for access to static tables and runtime services.

FIG. 2 is a block diagram of an embodiment system initialization and OS handoff state for access to static tables and runtime services. As shown at block 210, at boot time the firmware image, including BIOS, EFI, etc., initializes a system, e.g., prepares the system to handoff to the OS. As shown at block 220, the system initialization process creates an OS handoff state such that the OS knows how to handle the system, e.g., the location and types of devices, location of tables, entrypoints to run time services, etc.

Block 230 illustrates an embodiment of an OS handoff state. In this example, the OS handoff state includes ACPI pointers and entrypoints, 231-1, EFI pointers and entrypoints, 231-2, PAL pointers and entrypoints, 231-3, SAL pointers and entrypoints, 231-4, etc. The designator 231-N indicates that other pointers could additionally be included in the OS handoff state. Embodiments are not limited to the examples shown in FIG. 2. As shown in FIG. 2, the ACPI pointer 231-1 provides an access mechanism to ACPI tables 242. For example, the ACPI tables 242 can include a serial port console redirection (SPCR) table which provides information on how a system firmware set and service processor is to use an out-of-band management port. According to various embodiments, program instructions can execute to patch the SPCR table. For example, the program instructions can execute to: (1) change, add, or delete the SPCR table data in its existing memory location; (2) generate a new SPCR table and allocate an entirely new memory location for the same, i.e., adding new memory; and/or (3) change the pointer associated with the SPCR table. As used herein, adding includes allocating new memory for inserting static data, e.g., the OS handoff state data, or new runtime instructions, i.e., filtering, and then changing the parent pointers, e.g., 231-1, . . . , 231-N, or entrypoints to the newly allocated memory. Further, as used herein, deleting includes removing the parent entrypoints/pointers and changing intends changing data or instructions in their existing memory location.

As shown in the embodiment of FIG. 2, the ACPI tables 242 can also include a differentiated system description table (DSDT) which supplies the information and configuration information about a base system. The DSDT is inserted into the ACPI namespace by the OS at boot time. According to various embodiments, program instructions can execute to patch namespace to change ACPI machine language to change system information and devices, e.g., device type, behavior, and location information. For example, the program instructions can execute to move and/or hide devices in ACPI namespace, e.g., by changing a pointer associated with the same.

The embodiment of FIG. 2 illustrates the EFI pointer 231-2 can provide access to EFI associated tables and entrypoints 244. As the reader will appreciate the entrypoints are the access mechanism to associated boot and/or runtime services, e.g., GetVariable and/or SetVariable. According to various embodiments, the program instructions can execute to patch the EFI tables and/or filter the EFI entrypoints 244. For example, the program instructions can execute to: (1) change, add, or delete EFI table information or filter EFI runtime service entrypoints in an existing memory location; (2) generate a new EFI table or EFI runtime service entrypoint and allocate an entirely new memory location for the same; and/or (3) change the pointer associated with the above. Because EFI has multiple entrypoints, program instructions individually execute to patch and/or filter per table and entrypoint.

FIG. 2 illustrates the PAL pointer 231-3 can provide access to PAL associated tables and entrypoint 246. As the reader will appreciate, PAL has a central entrypoint 247, PAL_PROC. This central entrypoint 247 is the access mechanism to associated PAL runtime services, e.g., PAL_CACHE_FLUSH, etc. Thus, the program instructions can execute to modify this central entrypoint 247 for PAL runtime services. According to various embodiments, the program instructions can execute to patch the PAL tables and/or filter the PAL entrypoints 246. For example, the program instructions can execute to: (1) change, add, or delete PAL table information or filter the PAL runtime service entrypoint in an existing memory location; (2) generate a new PAL table or filter the PAL runtime service entrypoint and allocate an entirely new memory location for the same; and/or (3) change the pointer associated with the above, etc.

FIG. 2 similarly illustrates the SAL pointer 231-4 can provide access to SAL associated tables and entrypoint 248. In FIG. 2, SAL has a central entrypoint 249, SAL_PROC, to modify. This central entrypoint 249 is the access mechanism to associated SAL runtime services, e.g., SAL_PCI_CONFIG_READ, etc. Thus, the program instructions can execute to modify this central entrypoint 249 for SAL runtime services. According to various embodiments, the program instructions can execute to patch the SAL tables and/or filter the SAL entrypoint 248. For example, the program instructions can execute to: (1) change, add, or delete SAL table information or filter the SAL runtime service entrypoint in an existing memory location; (2) generate a new SAL table or SAL runtime service entrypoint and allocate an entirely new memory location for the same; and/or (3) change the pointer associated with the above, etc.

In the EFI, PAL, and SAL examples given above, program instructions can execute to change an entrypoint by doing one of the following. In one example embodiment the program instructions can execute to: modify arguments in a call to particular firmware (e.g., can be native and/or 3d party firmware); pass the modified arguments on to the existing firmware; use or change further the return values received from the existing firmware; and then provide the actual return value or further modify return values to the calling entity, e.g., the OS, loader, diagnostic software, etc. In another example embodiment the program instructions can execute to: pass, unchanged, the call to the existing firmware; change the return values received from the existing firmware; and then provide the changed return values to the calling entity. In another example embodiment the program instructions can execute to: perform alternative behavior, e.g., point to new firmware allocated in a new memory location and not pass the call to the originally called, e.g., native, firmware. Further, in other various embodiments the program instructions may execute to patch various tables and entrypoints and yet still pass, unchanged, a particular call to original, e.g., native, firmware; receive return values from the native firmware and leave them unchanged; and then deliver the unchanged return values to the calling entity.

Figure 3:
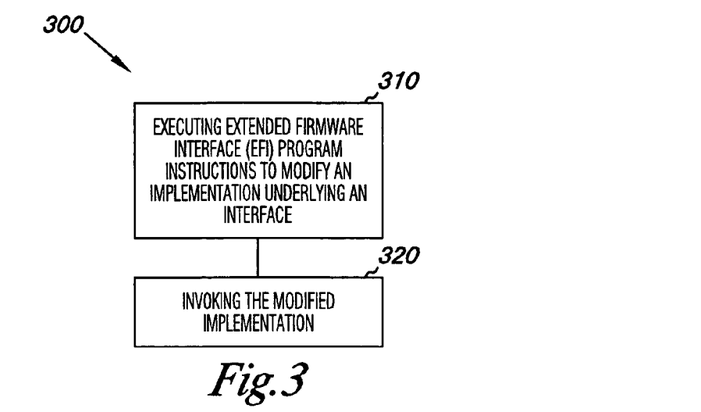
FIG. 3 is a block diagram illustrating a method embodiment for firmware modification on a system.
Figure 4:
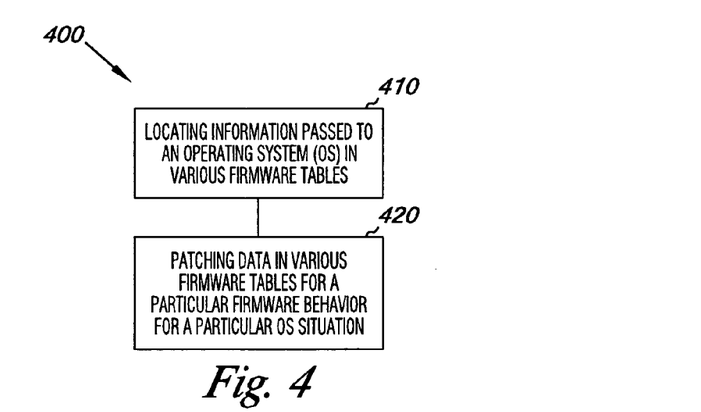
FIG. 4 is a block diagram illustrating a method embodiment for patching firmware.
Figure 5:
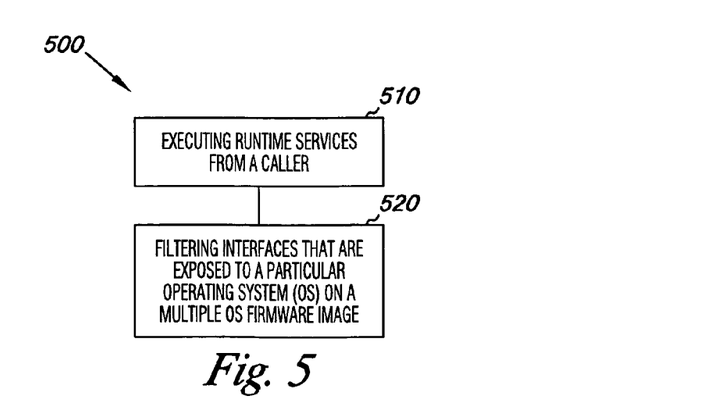
FIG. 5 is a block diagram illustrating a method embodiment for filtering firmware.

As will be described in connection with the method embodiments below in FIGS. 3-5, program instructions can execute to patch system firmware tables and/or filter system runtime services to modify firmware behavior for a particular OS situation, e.g., boot or runtime service, without modifying the firmware image on a system Method Embodiments FIGS. 3-5 illustrate various method embodiments according to the present invention. Unless explicitly stated, the method embodiments described herein are not constrained to a particular order or sequence. Additionally, some of the described method embodiments or elements thereof can occur or be performed at the same point in time. The embodiments can be performed by software and/or firmware (i.e., computer executable instructions), hardware, application modules, and the like, executable and/or resident on the systems and devices shown herein or otherwise.

FIG. 3 is a block diagram illustrating a method embodiment 300 for firmware modification on a system. As shown in FIG. 3, one method embodiment includes executing extended firmware interface (EFI) program instructions to modify an implementation underlying an interface as shown at block 310. That is, in various embodiments program instructions can be provided to the EFI which execute to change the behavior of particular firmware (e.g., native firmware and/or third party firmware). As described in connection with FIG. 2, the implementation of particular firmware may be underlying an interface selected from the group of: an EFI interface; a system abstraction layer (SAL) interface; a processor abstraction layer (PAL) interface; an advanced power configuration interface (ACPI), etc. Embodiments are not limited to these examples.

According to various embodiments these program instructions are executed to patch a table in a particular interface (e.g., EFI, SAL, PAL, ACPI interface, etc.) in order to modify the firmware implementation underlying the interface. As described in connection with FIG. 2, executing program instructions to patch a table in a particular interface can include executing instructions to change static table data in an existing memory location, e.g., to change static table data in an EFI, SAL, PAL, ACPI interface, etc. In various embodiments executing instructions to patch the table in a particular interface, includes program instructions that execute to modify the implementation underlying the interface by allocating a new memory location, generating a new static table, and inserting the new static table into the new memory location.

In various embodiments program instructions are executed to patch runtime service entrypoints in various interfaces, e.g., EFI, SAL, PAL, ACPI interfaces, etc. In these embodiments, program instructions are included that execute to add a new runtime service entry point by allocating a new memory location, generating a new entrypoint and/or runtime instructions, and inserting the new entrypoint or runtime instructions in the new memory location, and then changing the parent pointers, e.g., 231-1, . . . , 231-N in FIG. 2 to the newly allocated memory in order to change a particular firmware behavior in a particular OS operation, e.g., in a boot or runtime service, without having to change the firmware image on the system. Further, program instructions are provided that can execute to delete, e.g., remove, a parent entrypoint/pointer, e.g., in an interface or in the OS handoff state, in order to change a particular firmware behavior in a particular OS operation, e.g., in a boot or runtime service, without having to change the firmware image on the system. For example, program instructions can execute to generate a new entrypoint at a new memory location to be used solely for boottime services and/or runtime services. In this manner, program instructions described herein can execute to hide and/or move devices seen by a particular OS during a particular OS operation. Various embodiments of the disclosure include program instructions that can be executed to change runtime service instructions in their existing memory location as well. Embodiments are not limited to these examples.

As shown at block 320, embodiments include program instructions that can be executed to invoke a modified implementation of firmware. According to various embodiments, program instructions execute to use patched tables or runtime service entrypoints to invoke the modified implementation of firmware. For example, program instructions are provided that can execute to point to a new firmware implementation allocated in a new memory location. Program instructions are provided that can execute to filter runtime services such that certain functionality, e.g., an add-on driver or other set of program instructions, is invoked prior to calling into native firmware. These program instructions execute to insert themselves such that a call to a well known API first passes through a modified implementation.

For example, in one embodiment, program instructions are executed to: (1) modify arguments in a call to a particular set of firmware; (2) pass the modified arguments on to the particular set of firmware; (3) receive return values from the particular set of firmware; and (4) provide the received return value to a calling entity. In the various embodiments, the program instructions include instructions that can execute to: receive return values from the particular set of firmware; change the received return values; and provide the changed return values to the calling entity. In another example embodiment, program instructions are executed to: (1) pass unchanged a call to a particular set of firmware; (2) receive return values from the particular set of firmware; (3) modify the received return values; and (4) provide the modified return values to a calling entity. In another example embodiment, program instructions have been executed to patch tables and runtime service entrypoints. The program instructions can still execute such that a particular call to a particular set of firmware is handled in such a manner as to: (1) pass the particular call, unchanged, to the particular set of firmware; (2) receive return values from the particular set of firmware; and (3) deliver the received return values, unchanged, to a calling entity.

FIG. 4 is a block diagram illustrating a method embodiment 400 for patching firmware. In FIG. 4, program instructions execute to locate information passed to an operating system (OS) as contained in various firmware tables. As described in connection with FIGS. 2 and 3, program instructions can execute to locate firmware tables as table data in various interfaces, e.g., EFI, SAL, PAL, ACPI, etc., located above various firmware implementations. For example, program instructions can execute to locate SPCR and DSDT table data in an ACPI interface, shown as 242 in FIG. 2. Program embodiments further include instructions that can execute to locate EFI table data in an EFI interface, shown as 244 in FIG. 2. Program embodiments include instructions that can execute to locate PAL table data in a PAL interface, shown as 246 in FIG. 2. Program embodiments also include instructions that can execute to locate SAL table data in a SAL interface, shown as 248 in FIG. 2.

As shown at block 420, various embodiments include program instructions that execute to patch data in various firmware tables in order to provide a particular firmware behavior for a particular OS situation, e.g., a particular boot time and/or runtime service.

As another example, program instructions can execute to modify SAL associated tables and entrypoint, shown as 248 and 249 in FIG. 2. For example, the program instructions can execute to modify SAL's central entrypoint 249 for SAL runtime services. The program instructions can execute to: (1) change, add, or delete SAL table information or filter the SAL runtime service entrypoint in an existing memory location; (2) generate a new SAL table or SAL runtime service entrypoint and allocate an entirely new memory location for the same; and/or (3) change the pointer associated with the above, etc. Embodiments, however, are not limited to these examples.

Program instructions can also execute to maintain previous data which is still relevant to a particular firmware service subsequent to a firmware table modification. In other words, program instructions are executed such that various pointers in multilevel firmware tables can be modified to maintain the same hierarchy from the operating system perspective. Embodiments, however, are not limited to these examples.

By way of example and not by way of limitation, operation of the program instructions described herein can include a translation of ACPI 2.0 tables (e.g., tables described in publicly available ACPI specification version 2.0) to an alternative format used by legacy operating systems. Also, operation of the program instructions can include the addition of subordinate tables describing a device not known to the firmware but usable by the OS (e.g., the addition of a table which describes a console), or the addition of an OS-particular table that describes attributes of a platform, e.g., platform firmware 145 and/or platform hardware 150 in FIG. 1, particular to a given OS. And, as mentioned above, the operation of the program instructions can include the movement of devices in namespace, e.g., ACPI namespace, or include the patching of code that is pointed to by various tables such as the SAL code.

FIG. 5 is a block diagram illustrating a method embodiment 500 for filtering runtime services. As mentioned in connection with FIGS. 2 and 3 program instructions are provided which can execute to filter various interfaces that are exposed to the operating system such that certain functionality is invoked prior to calling into the native firmware, or third party firmware drivers. In the embodiment of FIG. 5, executing runtime services from a caller is represented in block 510. For example, executing a runtime service can include executing the runtime service with calls from a particular OS. A caller, or calling entity, can include a particular OS in a networked system. That is, a networked system can include a number of different OSs on various devices which share a firmware image for the system. The caller can also include diagnostic software, a loader, etc. One of ordinary skill in the art will appreciate that a number of runtime services can be executed from a number of different calling entities. Embodiments are not limited to the examples given above.

As shown at block 520, program instructions execute to filter firmware interfaces that are exposed to a particular OS on a multiple OS firmware image. Embodiments include program instructions that can execute to filter firmware interfaces in order to provide a particular firmware behavior for a particular OS situation. As described in connection with FIGS. 2 and 3, program instructions can execute to: (1) insert themselves and take over control and handling of a particular call to firmware; (2) modify a call to firmware before passing the call to a particular existing set of firmware; and (3) pass a call to the existing set of firmware, unchanged, and then modify the results received back from the firmware before returning the results to the calling entity.

For example, program instructions can execute to filter a SAL entrypoint. That is, program instructions can execute to insert themselves as the entrypoint to the SAL interfaces, e.g., entrypoint 249 in SAL interface 248 as shown in FIG. 2. In one example embodiment, the program instructions execute to take over control and serve as a new firmware interface to the kernel space by providing the same role as the previous APIs, but modifying the behavior of previous API such that the program instructions of the firmware filter return as the owning driver or firmware service. Additionally, in various embodiments as described in FIGS. 2 and 3, the program instructions execute to modify a call or its arguments before passing it down to other firmware services and/or the particular OS. For example, firmware tables and/or runtime instructions, described in connection with FIG. 2, can be passed to an operating system (OS) and the OS is free to consume them and then discard them. Program instructions can execute to filter which table data and/or runtime instructions are passed to a particular OS in order to provide a particular firmware behavior for in a particular operating system (OS) situation, e.g., runtime services, boot time services, etc.

In one example embodiment, program instructions can execute to use patched table data in an EFI interface to pass modified information to the particular OS. That is, the program instructions execute to modify code pointed to by a particular firmware table associated with a particular call type. As such, the program instructions can execute to filter the particular interfaces, e.g., EFI, SAL, PAL, ACPI, etc., that are exposed to an OS such that certain functionality, e.g., an add-on driver or other set of program instructions, is invoked prior to calling into the native firmware, or third party firmware drivers. In these embodiments, the add on driver or other set of program instructions operates in conjunction with the program embodiments to insert itself in a way such that a call to a well known API first passes through this filtered code and the filtered code can handle the call, modify it and pass it down, or pass it down first and modify it on the way back up. Program instructions can thus execute to change the behavior of a particular device in ACPI namespace associated with one or more particular sets of firmware in order to provide a particular modified firmware behavior in a particular operating system (OS) situation, e.g., runtime services, boot time services, etc., without changing a firmware image on the system, e.g., system 100 of FIG. 1. The program instructions can also execute to use the previous API and modify its behavior to return one or more different sets of firmware.

As described in FIGS. 2 and 3, program instructions can also execute to: (1) pass unchanged a call to a particular set of firmware; (2) receive return values from the particular set of firmware; (3) modify the received return values; and (4) provide the modified return values to a calling entity. In various embodiments, program instructions are executed to patch tables and runtime service entrypoints, and the program instructions execute to filter calls in such a manner that a particular call to a particular set of firmware is (1) passed, unchanged, to the particular set of firmware; (2) return values are received from the particular set of firmware; and (3) the received return values are delivered, unchanged, to the calling entity.

According to various embodiments, program instructions can execute to patch the code that is called for by a system abstraction layer (SAL) or a processor abstraction layer (PAL), replacing the location of the previous code with new code which has knowledge of the location of the previous code to call when needed. Program instructions can also execute to replace the interfaces themselves with alternate interfaces and/or handles.

Among various advantageous uses afforded by the disclosed program embodiments, one use includes execution of program instructions to hide block devices, e.g., storage devices, etc. In this example use, a particular OS on a multiple OS firmware image can, from its perspective, perceive that only certain intended disks, e.g., a single particular disk, is available on the computing system and/or network. This capability can be useful during an install operation to correctly identify the proper install disk and prevent confusion with other disks. Alternatively, a virtual device can be presented by modifying static tables and/or runtime services such as SAL's PCI services. Another use includes execution of program instructions as a filesystem filter. Various implementations of the program embodiments as a filesystem filter include executing the program instructions to add a file to a CD filesystem which is read only such that the file is visible to a particular operating system installation or boot.

Embodiments include the ability to execute program instructions, as described in FIGS. 2-5, to remap the slot or bus numbering for a particular OS in a multiple OS firmware image. For example, Windows Server 2003 does not understand PCI segments and is limited to 256 PCI buses, while other OSs do not have this limitation. According to the present disclosure, rather than having to make a particular set of firmware understand what OS it is running, program instructions described herein can execute to insert a driver onto PCI accesses performed by the SAL and provide translation between a densely packed PCI bus enumeration on a single segment and a firmware service with loosely packed buses across multiple segments. For example, according to various embodiments, program instructions can be provided at the EFI that execute to replace the SAL entrypoint, shown as 249 in FIG. 2, and instead pass a call through to program embodiments described herein for a decision on how to handle the call or program request. Embodiments are not limited to these example implementations.

Those of ordinary skill in the art will appreciate that an arrangement calculated to achieve the same techniques can be substituted for the specific embodiments shown. This disclosure is intended to cover adaptations or variations of various embodiments of the invention. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method comprising
   during booting, creating a volatile firmware-based image in memory based on original firmware code in non-volatile memory;
   during runtime, modifying said firmware-based image so as to alter its appearance to an operating system without modifying said original firmware code in non-volatile memory; and
   having an operating system interact with the modified firmware-based image in memory while said original firmware code in non-volatile memory remains unmodified; and
   adding a runtime service in an system abstraction layer (SAL) interface and a subordinate runtime service that describes a device not known to a firmware image on a system but useable by a particular operating system (OS).

2. A method as recited in claim 1 wherein said modifying involves executing instructions to patch a table in an interface selected from the group consisting of:

an EFI interface;
a system abstraction layer (SAL) interface;
a processor abstraction layer (PAL) interface; and
an advanced power configuration interface (ACPI).

3. A method as recited in claim 2 wherein executing instructions to patch the table in the interface to modify the firmware implementation underlying the interface includes executing instructions to change static table data in an existing memory location.

4. A method as recited in claim 3 wherein executing instructions to patch the table in the interface to modify the firmware implementation underlying the interface includes allocating a new memory location.

5. A method as recited in claim 4 wherein the method includes executing instructions to generate a new static table and to insert the new static table into the new memory location.

6. A method as recited in claim 4 further comprising executing instructions to generate new runtime instruction entrypoints and to insert the new runtime instruction entrypoints into the memory location.

7. A method as recited in claim 1 wherein executing EFI program instructions includes executing instructions to filter runtime services.

8. A method as recited in claim 7 wherein executing instructions to filter runtime services includes executing instructions to do one or a combination of:
 modify arguments in a call to a particular set of firmware;
 pass the modified arguments on to the particular set of firmware;
 receive return values from the particular set of firmware; and
 provide the received return value to a calling entity.

9. A method as recited in claim 8 wherein executing instructions to filter runtime services includes executing instructions to do one or a combination of:
 receive return values from the particular set of firmware;
 change the received return values; and
 provide the changed return values to the calling entity.

10. A method as recited in claim 7 wherein executing instructions to filter runtime services includes executing instructions to do one or a combination of:
 pass unchanged a call to a particular set of firmware;
 receive return values from the particular set of firmware;
 modify the received return values; and
 provide the modified return values to a calling entity.

11. A method as recited in claim 7 wherein executing instructions to filter runtime services includes executing instructions to point to a new firmware implementation allocated in a new memory location.

12. A method as recited in claim 7 wherein executing instructions to filter runtime services includes, having executed instructions to patch runtime service instruction entrypoints, executing instructions to do one or a combination of:
 pass unchanged a call to a particular set of firmware;
 receive return values from the particular set of firmware; and
 deliver the received return values, unchanged, to a calling entity.

13. A computer product comprising computer readable storage medium having executable instructions encoded thereon for during runtime, modifying said firmware-based image so as to alter its appearance to an operating system without modifying said original firmware code in non-volatile memory so that said firmware-based image interacts with an operating system while said original firmware code in non-volatile memory remains unmodified and adding a runtime service in an system abstraction layer (SAL) interface and a subordinate runtime service that describes a device not known to a firmware image on a system but useable by a particular operating system (OS).

14. A computer product as recited in claim 13 wherein said modifying involves executing instructions to move a device in advanced power configuration interface (ACPI) namespace.

15. A computer product as recited in claim 14 wherein said modifying involves patching a differentiated system description table.

16. A computer product as recited in claim 13 wherein said modifying involves executing instructions to hide a device in ACPI namespace.

17. A computer product as recited in claim 13 wherein said modifying involves executing instructions to change a runtime service in a system abstraction layer (SAL) interface.

18. A computer product as recited in claim 13 wherein the method includes executing instructions to delete a runtime service in a SAL interface.

19. A computer product as recited in claim 13 wherein the method includes executing instructions to add an OS particular table that describes attributes of a platform particular to the OS.

20. A computer product comprising computer readable storage medium having executable instructions encoded thereon to cause a device to perform a method for firmware modification, comprising:
 executing extended firmware interface (EFI) program instructions to:
 patch tables and runtime service entry points to modify a firmware implementation underlying an interface without modifying an EFI image in non-volatile memory;
 filter a call to firmware to invoke the modified firmware implementation;
 add a runtime service in a system abstraction layer (SAL) interface; and
 add a subordinate runtime service that describes a device not known to a firmware image on a system but useable by a particular operating system (OS).

21. A computer product as recited in claim 20 wherein executing instructions to filter the call to firmware includes executing instructions to modify the call to firmware before passing the call to a particular set of firmware.

22. A computer product as recited in claim 20 wherein executing instructions to filter the call to firmware includes executing instructions to pass the call, unchanged, to a particular set of firmware and to modify return values received back from the particular set of firmware.

23. A computer product as recited in claim 20 wherein executing instructions to filter the call to said firmware includes executing instructions to pass the call to a different set of firmware than that called by a calling entity.

24. A computing system, comprising:
 a processor;
 memory connected to the processor;
 a number of operating systems (OSs) on the system;
 an extended firmware interface (EFI) on the system;
 various platform hardware associated with particular OSs on the system;
 program instructions storable in the memory and executable by the processor to intercept and modify calls to extended firmware interface (EFI) firmware or returns from EFI firmware or both without altering underlying EFI firmware and add a runtime service and a subordinate runtime service, wherein the runtime service is added in a system abstraction layer (SAL) interface and the subordinate runtime service describes a device not known to a firmware image on a system but useable by one the particular operating system (OS).

25. A system as recited in claim 24 wherein the program instructions executable to modify firmware behavior include instructions that can execute to patch static tables associated with boot time services to modify firmware behavior associated with booting the particular OS.

26. A system as recited in claim 24 wherein the program instructions executable to modify firmware behavior include instructions that can execute to patch runtime service entry-points to modify firmware behavior associated with a particular runtime service.

27. A system as recited in claim 26 wherein the program instructions executable to patch runtime service entry points to modify firmware behavior associated with a particular runtime service includes program instructions executable to do one or a combination of:

change a runtime service entry point,
  add a runtime service entrypoint; and
  delete a runtime service entrypoint.

28. A system as recited in claim 26, wherein the program instructions executable to modify firmware behavior include instructions that can execute such that the particular operating system sees a single disk during an install.

* * * * *